United States Patent [19]

Nagashima

[11] Patent Number: 4,700,234
[45] Date of Patent: Oct. 13, 1987

[54] IMAGE PROCESSING SYSTEM

[75] Inventor: Nao Nagashima, Yokohama, Japan

[73] Assignee: Canon Kabushiki Kaisha, Tokyo, Japan

[21] Appl. No.: 642,267

[22] Filed: Aug. 20, 1984

[30] Foreign Application Priority Data

Aug. 30, 1983 [JP] Japan .................................. 58-158458
Aug. 30, 1983 [JP] Japan .................................. 58-158459

[51] Int. Cl.⁴ .............................................. H04N 1/41
[52] U.S. Cl. ..................................................... 358/260
[58] Field of Search .......... 358/260, 256, 78, 133–138, 358/261–262

[56] References Cited

U.S. PATENT DOCUMENTS 4,470,072 9/1984 Tanaka ................................. 358/260
4,491,874 1/1985 Yamamoto .......................... 358/260
4,504,115 3/1985 Ogawa ................................. 358/260
4,533,956 8/1985 Fedde ................................... 358/260
4,571,634 2/1986 Caneschi ............................. 358/260

FOREIGN PATENT DOCUMENTS

50338A1 4/1982 European Pat. Off. .

Primary Examiner—Michael A. Masinick
Attorney, Agent, or Firm—Fitzpatrick, Cella, Harper & Scinto

[57] ABSTRACT

An image processing system has, in a preferred embodiment a reader for reading an image of an original document, a page memory for storing at least one-page parallel image data, an encoder for compressing parallel image data from the page memory and generating the compressed image data onto a computer bus, a serial/parallel converter for receiving the serial image data from the reader and converting the data to parallel data to be stored in the page memory, and a transceiver for generating the parallel image data from the page memory without going through the decoder.

27 Claims, 6 Drawing Figures

IMAGE PROCESSING SYSTEM

BACKGROUND OF THE INVENTION

1. Field of the Invention

The present invention relates to an image processing system for electrically processing image data.

2. Description of the Prior Art

A so-called digital copying machine has become commercially available. In this copying machine, an original document is very precisely read by an image sensor such as a CCD, and the read signals are digitized and subjected to image enlargement/reduction processing and editing processing. Resultant digital signals are used to form an image by a printer such as a laser beam printer (LBP) or the like.

In a digital copying machine of this type, an expensive large-capacity page memory for storing image data is not used in order to obtain a low-cost construction and a high-speed operation. Instead, this digital copying machine has a small circuit size but processes digital signals at high speed. However, in order to obtain a facsimile system by using such a digital copying machine, it is very difficult to technically perform compression and expansion of digital data in units of lines in real time since the digital signals are processed at a very high speed, resulting in inconvenience.

In order to overcome this drawback, the digital signal is processed at low speed to decrease a scanning rate or recording speed of the original document. Alternatively, in the same manner as a conventional facsimile system, the original document is intermittently read to perform image forming operation which must then be matched with data compression/expansion.

In this case, the image forming apparatus must perform a different reading or recording operation depending upon whether it is used as a digital copying apparatus or as a facsimile system, resulting in a complex arrangement and high cost. This is contrary to the purpose described above.

It is therefore desired that a high-speed digital copying machine be usable without modification so as to perform as part of a facsimile system.

An arrangement having a bus for transmitting image data in addition to a bus for transmitting control data for controlling the operation of an image reading section and an image recording section results in high cost and a complicated configuration. However, when the image data is transmitted through the control bus, the bus is occupied by the image data for a long period of time, and normal control data will not be properly transmitted. In addition to this disadvantage, the image reading-/recording rate confined within the limit of a processing speed of a computer bus or another block connected thereto.

SUMMARY OF THE INVENTION

The present invention has been made in consideration of the above situation, and has as its object to provide an image processing system for effectively processing image data.

It is another object of the present invention to provide an image processing system for performing high-speed processing by image data compression and expansion without influencing image reading/recording.

It is still another object of the present invention to provide an image processing system suitable for transmitting/receiving image data.

It is still another object of the present invention to provide an image processing system for processing image data without providing a new bus for transmitting image data and without adversely affecting normal control data transmission.

It is still another object of the present invention to provide an image processing system for processing image data from an image reading apparatus or to an image recording apparatus through a computer bus (e.g., a MULTIBUS), the image reading or recording apparatus having a processing speed higher than that of the computer bus.

It is still another object of the present invention to easily provide a facsimile system function in a digital copying machine without adversely affecting its normal operation.

According to the present invention, the foregoing objects are attains by providing an image processing system comprising means for reading an image of an original, memory means for storing at least a page of image data generated by the read means, means for transmitting image data to an external device (such as a facsimile terminal), means for compressing image data read from the memory means and for supplying the compressed data to the transmissing means, and means for supplying image data read from the memory means to the transmitting means without compression of the image data. This arrangement makes possible transmission using either a compression or a non-compression format.

In another aspect, the invention is directed to an image processing system in which a processing means connected to a bus line receives image data appearing on the line, for example from a read means, and stores or transmits the received data. Image data from the read means is stored in a memory means having a capacity of at least one page, and is compressed by a compression means connected to the bus line. The compression means may for example send the compressed image data onto the bus line in response to an instruction from the processing means. Again, the processing means may send compressed image data onto a bus line for expansion by an expansion device preparatory to storing in the memory, from which the expanded image data is supplied to a printing means in synchronism with printing operation of the latter.

According to another aspect of the invention, an image processing system may be provided with means for reading an image of an original to generate image data, and printing means, together with means connected to a bus line for processing image data and other means connected to the bus line for transmitting data from the read means to the processing means through the line and for receiving processed image data from the processing means also through the line and supplying the processed data to the printing means. According to this aspect of the invention, the read means is arranged for direct connection to the printing means without the need for data transmitted from one to the other to pass through the bus line, so that the system is operable as a copying machine.

The above and ther objects, features and advantages of the present invention will be more fully appreciated from the following detailed description in conjunction with the accompanying drawings.

DETAILED DESCRIPTION OF THE PREFERRED EMBODIMENT

The present invention will be described in detail with reference to a preferred embodiment.

Figure 1:
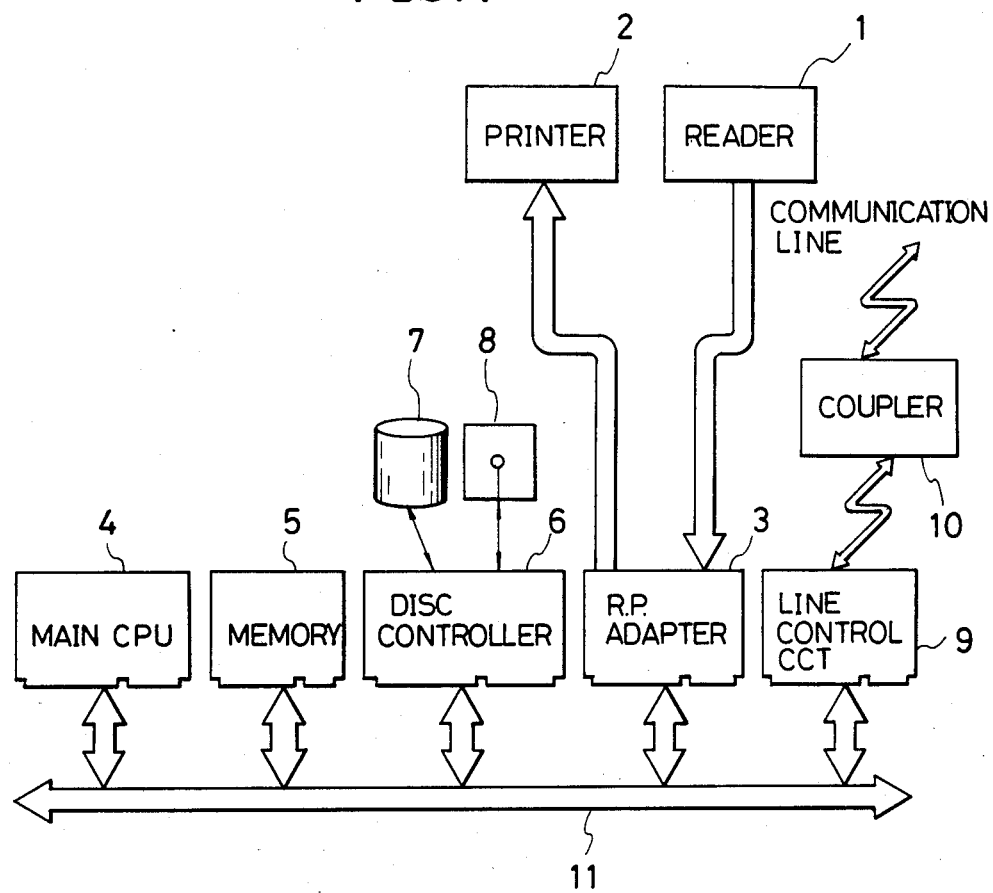
FIG. 1 is a block diagram of an image processing system according to an embodiment of the present invention.

FIG. 1 is a block diagram showing a system to which the present invention is applied.

In a reader 1, an original document is read by a CCD image sensor or the like at high speed. After the read analog signal is converted to a digital signal, the digital signal is subjected to shading correction and digitization. Finally, a digital image signal is supplied to an external circuit.

A printer 2 forms an image on a printing paper sheet at high speed in accordance with the digital image signal in the same manner as a laser beam printer (LBP). When the reader 1 is directly connected to the printer 2, they are electrically disconnected from a computer bus 11 to be described in detail later and serve as an independent copying machine. In this embodiment, a connection interface is added to connect the reader 1 and the printer 2, thereby providing a facsimile system function without greatly modifying the reader 1 and the printer 2.

An RP adapter 3 serves as a converter for converting high-speed digital image signals associated with the reader 1 and the printer 2 to signals which can be subjected to easy transmission and processing through the computer bus 11. The computer bus 11 comprises, for example, a low-cost bus such as a MULTIBUS available from Intel Corporation. Control data are exchanged through the computer bus 11 between a main CPU 4 for performing main control of the computer bus 11, a memory 5 for storing at least one-page image data, a disc controller 6 for controlling the read/write operation of a magnetic disc and a floppy disc 8, and a line control circuit 9. These blocks are mounted on circuit boards connected to the computer bus 11 together with the RP adapter 3. Any other electronic equipment such as a wordprocessor or an office computer may if desired also be connected to the computer bus 11 to transmit data excluding image information.

Original document image data read by the reader 1 is converted by the RP adapter 3 to data having a format suitable for processing through the computer bus 11. The converted data is transmitted onto the computer bus 11 and is then temporarily stored in a memory 5. The data read out the memory 5 is stored in the magnetic disc 7 and the floppy disc 8 through the disc controller 6, as needed. The stored data can be read out from these external memory devices and can be transmitted to an external processor such as a host computer through the line control circuit 9 and a coupler 10 via the computer bus 11.

Image data transmitted from the external processor through a communication line is stored in the memory 5 through the coupler 10, the line control circuit 9 and the computer bus 11. This image data can be stored by the disc controller 6 in the magnetic disc 7 and the floppy disc 8, as needed. The data stored by the disc controller 6 is read out and is subjected to reverse conversion in the RP adapter 3 through the computer bus 11. The converted data is supplied to the printer 2 and is printed on a printing paper sheet.

The above series of facsimile operations is performed under the control of the main CPU 4. When the system is used as a copying machine by directly connecting the reader 1 and the printer 2, the system is operated in accordance with a command at the operation panel on the reader 1.

Data transfer between the RP adapter 3, the main CPU 4 and the memory 5 through the computer bus 11 will be described with reference to FIGS. 2 and 3.

Figure 2:
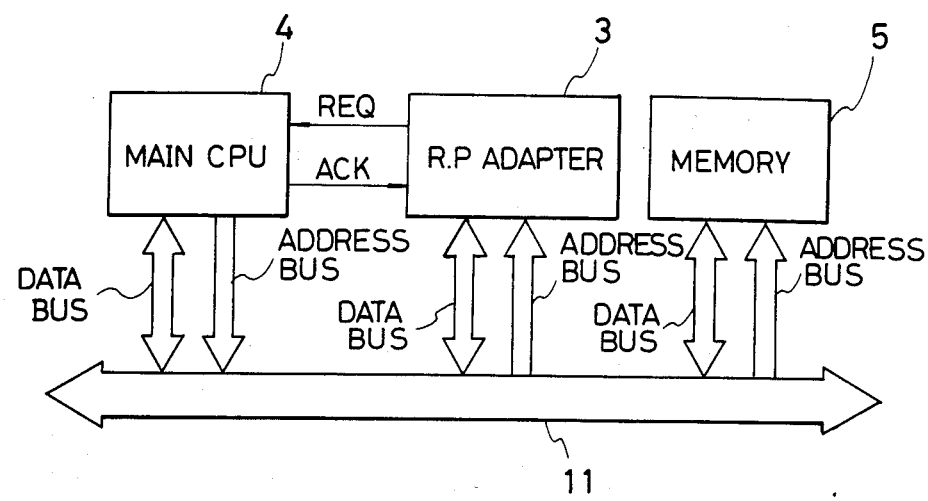
FIG. 2 is a block diagram for explaining data transfer.

In a block diagram shown in FIG. 2, the main CPU 4 controls an address signal on the computer bus 11. Therefore, the data transfer between the RP adapter 3 and the memory 5 is performed by a kind of direct memory access (DMA) in such a manner that the CPU 4 generates an address signal for accessing the storage location of the memory 5, and the RP adapter 3 performs data input/output operation independently of the address signal.

Assume that image data is transferred from the RP adapter 3 to the memory 5. The main CPU 4 supplies an image data sending start instruction to the RP adapter 3 through the computer bus 11. When the RP adapter 3 receives this instruction, it starts an image data send ready operation.

When the image data send ready operation is completed in the RP adapter 3, the adapter 3 supplies an REQ signal to the main CPU 4. When the main CPU 4 receives the REQ signal, the CPU 4 accesses the write address of the memory 5 where the image data on the computer bus 11 can be transferred. At the same time, the main CPU 4 supplies an ACK signal to the RP adapter 3.

The RP adapter 3 sends the image data onto the computer bus 11 through a data bus for a time interval in which the ACK signal is held active. Meanwhile, the main CPU 4 writes the fetched data through the data bus in the memory 5. The main CPU 4 disables the ACK signal upon completion of the write operation. In response to this operation, the RP adapter 3 disables the REQ signal, thereby completing one-word data transfer. By repeating the above operation, one-page image data transfer is carried out.

The image data transfer from the memory 5 to the RP adapter 3 is performed in the following manner. The main CPU 4 supplies an image data reception start instruction to the RP adapter 3 through the computer bus 11. When the RP adapter 3 receives this instruction and completes the reception ready operation, the RP adapter 3 supplies the REQ signal to the main CPU 4. When the main CPU 4 receives the REQ signal, it supplies the ACK signal to the RP adapter 3 when the image data on the computer bus 11 is to be transferred. At the same time, the main CPU 4 causes the memory 5 to read out necessary data, so that the RP adapter 3 receives the data on the computer bus 11 through the data bus. The main CPU 4 makes the ACK signal active during the data fetch interval. The main CPU 4 also disables the REQ signal at the trailing edge of the ACK signal, thereby completing the data transfer. By repeating the above operation, the one-page image data can be transferred from the memory 5 to the RP adapter 3.

In the above embodiment, the one-word image data is transferred in response to the ACK signal. However, the amount of data to be transmitted for each transfer operation can be increased/decreased in accordance with bus format and any other processing block connected to the bus.

Figure 3:
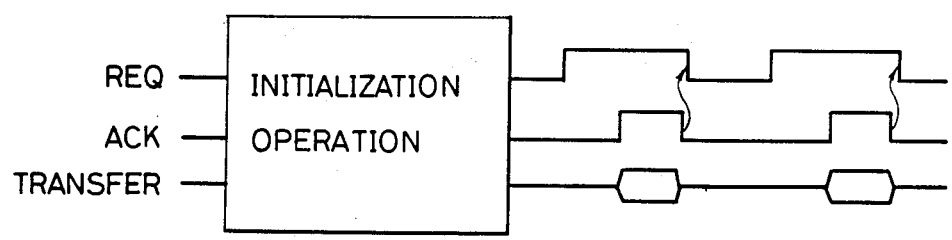
FIG. 3 is a timing chart for explaining the data transfer block shown in FIG. 2.

FIG. 3 is a timing chart for explaining the transfer operation described above. The circuit initialization is performed in response to the image data sending or reception start instruction. Thereafter, data transfer between the RP adapter 3 and the memory 5 through the computer bus 11 is performed in synchronism with the ACK signal from the CPU 4 during the ON period of the REQ signal from the RP adapter 3.

The image data transfer enable operation in response to the REQ and ACK signals is performed by software stored in a memory under the control of the main CPU 4. However, in order to achieve high-speed operation, special hardware such as a DMA controller may be used.

The configuration of the RP adapter 3 will be described in detail with reference to the block diagram in FIG. 4.

The RP adapter 3 can be divided into two large blocks: a control block mainly having a CPU 116 and connected to a CPU bus 51; and an image block mainly having a page memory 107 so as to process image data.

The image block will be described first.

The reader 1 reads an original document at a resolution of 16 pixels/mm and at a high speed of 182 mm/sec. Digital image data transferred from the reader 1 at a frequency of 18 MHz is supplied to a reader interface 121 through a cable 125. The reader interface 121 supplies as serial image signals an image signal VIDEO, clock signals CLOCK respectively synchronized with the pixels represented by the image signal VIDEO, a video enable signal VE representing the ON period of the one-line image signal VIDEO, and a vertical sync signal VSYNC representing the ON period of the one-page image signal VIDEO to a serial-parallel converter 110. The serial image signals VIDEO sequentially supplied to the serial-parallel converter 110 are converted in units of, for example, 16 pixels/word. The converted image signals are sequentially stored in a page memory 107 through an image bus 50. The page memory 107 has a sufficient memory capacity for a maximum amount of data transmitted from the reader 1. The page memory 107 comprises, for example, a DRAM. For example, when the reader 1 reads an original document having a size up to the A3 size in the form of binary data representing 16 pixels per mm along each of the main scan and subscan directions, the page memory 107 must have a capacity of at least 3,193,344 bits (=420 mm×16×297 mm×16) so as to store the image signals VIDEO.

Since the serial image signals are converted to the parallel image signals, the access time of the page memory 107 can match with the high frequency of the serial image signals generated from the reader 1. In addition, the operating speed of the page memory 107 is decreased to stabilize the entire circuit operation.

An address counter 108 generates read and write addresses of the page memory 107 so as to read the data on the image bus 50 from or write it in the page memory 107. The address counter 108 is controlled by a controller 109 to be synchronized with the input/output blocks such as the reader 1 and the printer 2. The controller 109 comprises, for example, a DAM controller 8089 available from Intel Corporation.

One-page image data written in the page memory 107 are read out as parallel data as needed and are encoded by an encoder 102 in accordance with a compression technique such as MH (modified Huffman) coding or MR (modified read) coding. The encoded data having a predetermined length is written in a FIFO RAM 101. When the FIFO RAM 101 has stored a predetermined amount (e.g., 17 words) of data, the controller 109 supplies the REQ signal to the main CPU 4 to request the data read operation. When the main CPU 4 receives the REQ signal, the CPU 4 is operated in the manner described above. In other words, the main CPU 4 generates the ACK signal and fetches the data from the FIFO RAM 101 through a buffer 100. By repeating the above operation, one-page image data is entirely read out from the page memory 107. However, when the main CPU 4 does not generate ACK signal, the data fetch from the page memory 107 to the encoder 102 is temporarily stopped. In this manner, the data stored in the page memory 107 is compressed as needed asynchronousally with the reader 1, and the compressed data is sent onto the computer bus 11. When compression need not be performed, the image data read out from the page memory 107 is sent onto the computer bus 11 through a transceiver 106.

When the image data is compressed by the encoder 102, the operating speeds of the image bus 50 and the computer bus 11 vary in accordance with a compression ratio. For example, when image data is compressed by the encoder 102 at a compression ratio of 1/10, the transmission rate of the computer bus 11 may be 1/10 that of the image bus 50 in accordance with a simple calculation. According to this embodiment, the image bus 50 comprises hardware which enables high-speed operation. In addition to this, data compression is also performed, so that the load of the computer bus 11 can be decreased, and the data transmission efficiency can be substantially increased.

On the other hand, when the compressed data is transferred from the computer bus 11 in response to the REQ signal from the controller 109 and in synchronism with the ACK signal from the main CPU 4, the data is written in a FIFO RAM 104 through a buffer 103 asynchronousally with the printer 2 in accordance with the procedures described above. This compressed data is expanded by a decoder 105 and is written through the image bus 50 in a memory area at an address location of the page memory 107 which is accessed by the address counter 108. The REQ signal is generated when the FIFO RAM 104 is not full. In this case, the controller 109 controls the address counter 108, the decoder 105 and the like. In this manner, one-page image data supplied through the computer bus 11 is stored in the page memory 107 asynchronically with the printer 2. When noncompressed image data runs on the computer bus 11, this image data is stored in the page memory 107 through the transceiver 106.

The FIFO RAMs 101 and 104 are first-in first-out random access memories for reducing the frequency of the waiting state of one of the image bus 50 and the computer bus 11 even if operating speed thereof changes.

Figure 5:
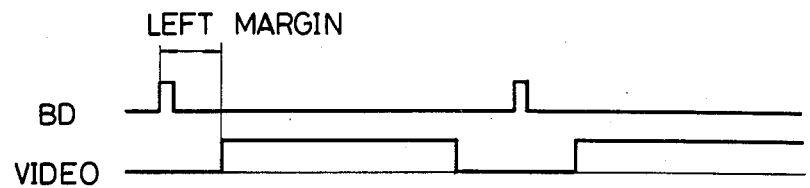
FIG. 5 is a timing chart for explaining image recording.

The image data stored in the page memory 109 is supplied to the printer 2 in the following manner. When a print instruction is generated, a left margin control circuit 112 starts counting oscillation clocks from an oscillator 113 for controlling the operation of the printer 2 in response to a main scan sync signal BD supplied from the printer 2 thereto through a cable 126 and a printer interface 122. The left margin control circuit 112 delays the operation of a parallel-serial converter 111 for a time period corresponding to the count representing the left margin (timing chart in FIG. 5). The serial image signal VIDEO is thus supplied to the printer 2 through the printer interface 122 and the cable 126 at a predetermined timing. The "left margin" here means a time interval from the time at which a laser beam which scans the rasters is detected by a photosensor arranged at a predetermined position in the laser beam printer (LBP) and to the time at which the laser beam reaches at a predetermined write position on the photosensitive drum. A sensor output from the photosensor corresponds to the main scan sync signal BD. In this manner, the image data on the computer bus 11 is written in the page memory 107 asynchronically with the printer 2. Thereafter, the image data is read out in synchronism with the operation of the printer 2, thereby performing image recording.

Figure 6:
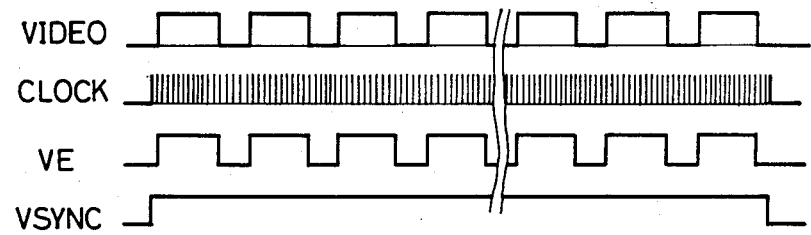
FIG. 6 is a timing chart for explaining image reading.

FIG. 6 is a timing chart showing signals of the reader interface 121 and the serial-parallel converter 110. The image signal VIDEO is sent out in synchronism with the clock signal CLOCK. A VE signal as an interval signal along the main scan direction for the image signal VIDEO and a VSYNC signal as an interval signal along the subscan direction for the image signal VIDEO are supplied from the reader interface 12 to the serial-parallel converter 110. These signals are also supplied to the controller 109 through a serial communication circuit 123 and are used to control the address counter 108 for determining write addresses of the page memory 107.

Referring again to FIG. 4, the control block will be described in detail.

Control data generated from the main CPU 4 and appearing on the computer bus 11 is written in a RAM 114 through a three-direction transceiver 115. The CPU 116 comprises a microcomputer such as an 8086 available from Intel Corporation and controls the entire operation of the RP adapter 3. A control program is prestored in a ROM 117 and can be executed under the control of the CPU 116. The CPU 116 fetches information such as image data written in the RAM 114 and controls image data read operation, write selection, and the read operation of the data associated with the image data to be transferred. On the other hand, the CPU 116 writes data in the RAM 118. These data represent the operating states of the reader 1, the printer 2 and the RP adapter and are transferred to the main CPU 4 by using the transceiver 115. The transfer of these data can be performed by using an interruption signal on the computer bus 11. An interruption controller 120 controls the interruption.

An I/0 port 119 controls parallel signals such as connection and power-on signals in the reader interface 121 and the printer interface 122.

Serial communication circuits 123 and 124 perform communication control operations such as original document size control, print size control, operation start/stop control and abnormal state control between the CPU 116 and the reader 1 and between the CPU 116 and the printer 2, respectively.

The transceiver 106 sends the image signal from the page memory 107 to the computer bus 11 and stores the noncompressed data from the computer bus 11 in the page memory 107. It should be noted that a signal representing whether or not image data transmitted on the computer bus 11 is compressed is transmitted together with the image data.

When the transmission ratio of the computer bus 11 is relatively high, and the computer bus 11 can be occupied by the image data for a relatively long period of time, the image data need not be compressed. In this case, the image data between the reader 1 or the printer 2 and the transceiver 106 is transmitted without going through the page memory 107.

As has been described above, there is provided an image processing system wherein the image data can be transmitted by using an external connection bus for transmitting control data between the respective blocks in the image processing system, and at the same time, the control data transmission through the external connection bus will not be disturbed.

Image reading and recording can be performed irrespective of the processing speed of the external connection bus or any other block connected thereto. Therefore, the facsimile function can be obtained in the digital copying machine without greatly modifying the copying function.

The present invention is not limited to the particular embodiment described above. Various changes and modifications may be made within the scope and spirit of the invention and the appended claims.

What is claimed is:

1. An image processing system comprising:
   read means for reading an image of a original document and generating image data representing the image;
   memory means for storing at least a page of image data generated by said read means and for reading out the stored image data;
   means for transmitting image data to an external device;
   compression means for compressing image data read out from said memory means and supplying the compressed image data to said transmitting means; and
   means for supplying image data read out from said memory means to said transmitting means without the supplied image data passing through said compression means.

2. A system according to claim 1, wherein said reading means generates image data in serial form, and further comprising write means for converting the image data generated by said read means to parallel data and writing the parallel data in said memory means.

3. A system according to claim 1, wherein the image data is supplied to said transmitting means by said compression means and said supplying means through a bus line.

4. A system according to claim 3, further comprising processing means, connected to said bus line, for processing image data taken in from said bus line.

5. A system according to claim 1, wherein said read means performs a read operation asynchronously with a compression operation by said compression means and supplies the image data to said memory means.

6. A system according to claim 1, wherein, after a page of image data is stored in said memory means, the stored image data is read out from said memory means.

7. An image processing system comprising:

read means for reading an image of an original document and generating image data representing the image;

processing means, connected to a bus line, for receiving image data appearing on said bus line and storing or transmitting the received image data;

memory means for storing at least a page of the image data generated by said read means; and compression means, connected to said bus line, for compressing the image data read out from said memory means, said compression means sending the compressed image data onto said bus line therefrom in response to an instruction from said processing means.

8. A system according to claim 7, wherein said read means performs a read operation in asynchronism with a compression operation by said compression means and supplies the image data to said memory means.

9. A system according to claim 7, wherein the image data is read out from said memory means in response to an instruction from said compression means.

10. A system according to claim 7, wherein said compression means sends the compressed image data representing the image of an original in a divided manner onto said bus line.

11. A system according to claim 7, wherein said compression means includes buffer means for storing the compressed image data, and sends the compressed image data from said buffer means onto said bus line in response to the instruction from said processing means.

12. A system according to claim 7, wherein after a page of image data is stored in said memory means, the image data is read out from said memory means.

13. A system according to claim 7, wherein said processing means comprises storage means for storing the compressed image data.

14. A system according to claim 7, wherein said processing means comprises transmitting means for transmitting the compressed image data to an external device.

15. An image processing system comprising:

processing means, connected to a bus line, for sending compressed image data onto said bus line;

printing means for printing an image on a printing medium, based on image data;

expansion means, connected to said bus line, for expanding the compressed image data received from said bus line; and memory means for storing at least a page of image data from said expansion means, said memory means supplying the stored image data to said printing means in synchronism with a printing operation of said printing means.

16. A system according to claim 15, wherein said printing means performs a recording operation in asynchronism with expansion operation by said expansion means.

17. A system according to claim 15, wherein said processing means is storage means for storing the compressed image data.

18. A system according to claim 15, wherein said processing means is reception means for receiving the compressed image data transmitted from an external device.

19. A system according to claim 15, wherein said printing means comprises a laser beam printer.

20. A system according to claim 15, wherein, after a page of image data is stored in said memory means, the stored image data is read out from said memory means.

21. An image processing system comprising:

read means for reading an image of an original and generating image data representing the image;

printing means for printing an image on a printing medium, based on image data;

a processing means, connected to a bus line, for processing image data; and communication means, connected to said bus line, for transmitting the image data from said read means to said processing means through said bus line and for receiving processed image data from said processing means through said bus line and supplying the received processed image data to said printing means, wherein said read means is directly connected to sid printing means without passing through said bus line, so that said system is operable as a copying machine.

22. A system according to claim 21, wherein said communication means comprises memory means for storing at least a page of image data.

23. A system according to claim 21, wherein said processing means comprises reception means for receiving image data transmitted from an external device.

24. A system according to claim 21, wherein said processing means comprises storage means for storing image data.

25. A system according to claim 21, wherein said processing means comprises transmitting means for transmitting image data to an external device.

26. A system according to claim to claim 21, wherein said printing means comprises a laser beam printer.

27. A system according to claim 21, wherein said communication means comprises means for compressing image data to be transmitted and means for expanding the received compressed image data.

* * * * *

UNITED STATES PATENT AND TRADEMARK OFFICE
CERTIFICATE OF CORRECTION

PATENT NO. : 4,700,234            Page 1 of 2

DATED : October 13, 1987

INVENTOR(S) : NAO NAGASHIMA

It is certified that error appears in the above-identified patent and that said Letters Patent is hereby corrected as shown below:

AT [57] IN THE ABSTRACT

"ment" should read --ment,--.

IN THE DRAWINGS

Figure 4:
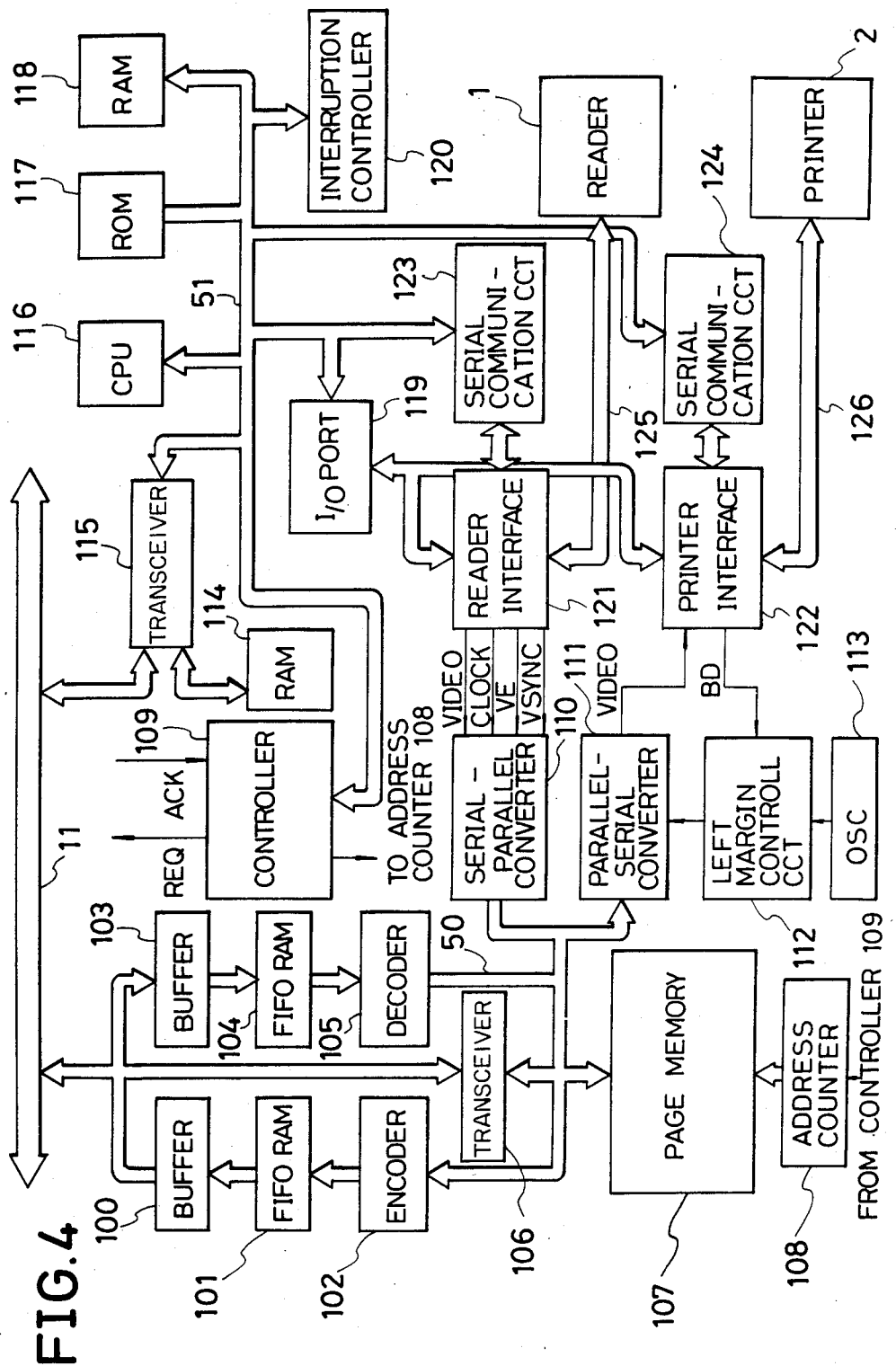
FIG. 4 is a block diagram of an RP adapter shown in FIGS. 1 and 2.

Sheet 3, Figure 4, "LEFT MARGIN CONTROLL CCT" should read --LEFT MARGIN CONTROL CCT--.

COLUMN 1

Line 55, "rate confined" should read --rate is confined--.

COLUMN 2

Line 21, "attains" should read --attained--.
Line 28, "transmissing" should read --transmitting".

COLUMN 6

Line 25, "chronousally" should read --chronously--.
Line 48, "chronousally" should read --chronously--.
Line 58, "asynchronically" should read --asynchronously--.

COLUMN 7

Line 21, "asynchronically" should read --asynchronously--.
Line 32, "12" should read --121--.

UNITED STATES PATENT AND TRADEMARK OFFICE
CERTIFICATE OF CORRECTION

PATENT NO. : 4,700,234
DATED : October 13, 1987
INVENTOR(S) : NAO NAGASHIMA

It is certified that error appears in the above-identified patent and that said Letters Patent is hereby corrected as shown below:

COLUMN 8

Lines 49-50, "read-ing" should read --read--.

COLUMN 10

Line 24, "tosaid" should read --to said--.
Line 31, "sid" should read --said--.

Signed and Sealed this

Second Day of February, 1988

Attest:

DONALD J. QUIGG

Attesting Officer      Commissioner of Patents and Trademarks